(12) United States Patent
Lagneaux et al.

(10) Patent No.: US 9,453,107 B2
(45) Date of Patent: Sep. 27, 2016

(54) METHOD FOR PREPARING A POLYAMIDE BY REACTIVE EXTRUSION, AND EXTRUDER ADAPTED FOR THE IMPLEMENTATION OF SUCH A METHOD

(71) Applicant: SETUP PERFORMANCE, Frontonas (FR)

(72) Inventors: Didier Lagneaux, Bluffy (FR); Jerome Gimenez, Bron (FR); Anne-Carine Brosse, Bourgoin Jailleu (FR); Laurent Goujard, Saint-priest (FR); Henri Sautel, Lyons (FR)

(73) Assignee: SETUP PERFORMANCE, Frontonas (FR)

( * ) Notice: Subject to any disclaimer, the term of this patent is extended or adjusted under 35 U.S.C. 154(b) by 0 days.

(21) Appl. No.: 14/417,304

(22) PCT Filed: Jul. 25, 2013

(86) PCT No.: PCT/FR2013/051793
§ 371 (c)(1),
(2) Date: Jan. 26, 2015

(87) PCT Pub. No.: WO2014/016521
PCT Pub. Date: Jan. 30, 2014

(65) Prior Publication Data
US 2015/0191569 A1 Jul. 9, 2015

(30) Foreign Application Priority Data
Jul. 27, 2012 (FR) ..................... 12 57317

(51) Int. Cl.
| | | |
|---|---|---|
| C08G 69/28 | (2006.01) | |
| B29C 47/00 | (2006.01) | |
| B29C 47/10 | (2006.01) | |
| B29C 47/60 | (2006.01) | |
| C08G 69/04 | (2006.01) | |
| B01J 19/24 | (2006.01) | |
| C08G 69/36 | (2006.01) | |

(52) U.S. Cl.
CPC ............... *C08G 69/28* (2013.01); *B01J 19/24* (2013.01); *B29C 47/0004* (2013.01); *B29C 47/1081* (2013.01); *B29C 47/6025* (2013.01); *B29C 47/6056* (2013.01); *C08G 69/04* (2013.01); *B01J 2219/24* (2013.01); *C08G 69/36* (2013.01)

(58) Field of Classification Search
CPC ........ C08L 77/00; C08G 69/04; C08G 69/36
See application file for complete search history.

(56) References Cited

U.S. PATENT DOCUMENTS

| | | | |
|---|---|---|---|
| 3,040,005 A | 6/1962 | Bernhardt et al. | |
| 4,760,129 A | 7/1988 | Haering et al. | |
| 6,187,877 B1 | 2/2001 | Gotz et al. | |
| 2010/0190952 A1* | 7/2010 | Desbois ............... | C08G 69/265 528/288 |

FOREIGN PATENT DOCUMENTS

| | | |
|---|---|---|
| DE | 4329676 A1 | 3/1994 |
| EP | 0410649 A1 | 1/1991 |
| EP | 0410650 A1 | 1/1991 |
| GB | 1289349 A | 9/1972 |
| JP | 2004337323 A | 12/2004 |
| JP | 2007228693 A | 9/2007 |
| WO | 9314145 A1 | 7/1993 |
| WO | 9633234 A1 | 10/1996 |
| WO | 9961509 A1 | 12/1999 |
| WO | 2008/005415 A1 | 1/2008 |
| WO | 2008155271 A1 | 12/2008 |

OTHER PUBLICATIONS

International Search Report dated Dec. 20, 2013, corresponding to International Patent Application PCT/FR2013/051793.
Ha, S. K. et al. :"Continuous Polymerization and Copolymerization of Lauryl Lactam in a Modular Corotating Twin Screw Extruder", International Polymer Processing, Munich, DE, vol. 13, No. 2, Jan. 1, 1998, pp. 136-141.
Written Opinion from the Intellectual Property Office of Singapore dated May 3, 2016, corresponding to Singapore patent application No. 11201500217X.

* cited by examiner

*Primary Examiner* — Gregory Listvoyb
(74) *Attorney, Agent, or Firm* — Ladas & Parry LLP (57) ABSTRACT

The object of the invention is a method for preparing a polyamide from one or several monomers adapted for the preparation of polyamide characterized in that the selected monomer(s), is(are) introduced without any preliminary reaction and without any preliminary preparation of the corresponding salt, in an extruder including at least two conveying screws rotating co-rotatively and in that all the reaction and polycondensation steps, initially starting from the selected monomer(s), and giving the possibility of ending up with the desired polyamide, are conducted in an extruder including at least two conveying screws rotating co-rotatively, and polycondensation is achieved by carrying out at least two operations for discharging the by-product(s) formed by the polycondensation reaction.

33 Claims, 2 Drawing Sheets

$Z_0$: Area for introducing the monomers
$Z_1$: Mixing area
$Z_2$: Isolation area
$Z_3$: Polycondensation area
$Z_4$: Transport and cooling area

METHOD FOR PREPARING A POLYAMIDE BY REACTIVE EXTRUSION, AND EXTRUDER ADAPTED FOR THE IMPLEMENTATION OF SUCH A METHOD

This application is a 371 of PCT/FR2013/051793, filed on Jul. 25, 2013, which claims priority to French Application No. 1257317, filed Jul. 27, 2012.

The present invention relates to the technical field of polyamide production. In particular, the invention relates to a method for preparing by polycondensation a polyamide polymer by reactive extrusion and to the extruders adapted for applying such a method.

Polyamides are most often prepared by polycondensation of a diamine and of a diacid. Such polycondensation reactions are conventionally carried out in a reactor with a continuous or batch method. During the preparation of polyamides, the first step consists in the formation of a salt from diacid and diamine monomers. This salt, conventionally called a nylon salt, in an aqueous solution or not, is introduced into a reactor and heated under pressure until a mixture with sufficient viscosity is obtained. The water introduced initially and formed during the reaction is removed by putting the reactor under reduced pressure. At the outlet of a reactor, the viscosity of the polymer is generally insufficient and an additional step is required for obtaining polyamides notably of the extrusion grade. This step consists in a heat treatment step, also-called annealing, which corresponds to post-condensation in a solid phase. This last step may be carried out in a high temperature reactor under reduced pressure or in the presence of an inert gas, or further continuously in an extruder.

Such methods not only require long reaction times (of the order of one to several hours), but also transfer of the material during different steps of the method: synthesis of the salt, polycondensation in a reactor and post-condensation in a solid phase.

Different alternatives of such methods or improvement attempts have been proposed in the literature.

First of all, mention may be made of methods using extrusion which give the possibility of obtaining polyamides with high molar masses by starting with pre-polymers. The pre-polymers are synthesized according to one or several conventional methods in a reactor, and then post-condensation is achieved in an extruder under reduced pressure. The polyamides described in this case are generally semi-aromatic or aromatic polyamides, the preparation of which is less easy than aliphatic polyamides. The time dependent change in the molar masses is typically measured by an increase of the viscosity in solution of the polyamides (reduced, relative or inherent viscosities). In order to illustrate such methods, mention may be made of the following patent documents:

Patent application EP 0 410 649 describes a method for preparing a semi-aromatic polyamide wherein a pre-polymer of a semi-aromatic polyamide terminated with carboxylic acid of a mass of 5,000 g/mol (inherent viscosity of 0.25-0.35 dl/g) is introduced into an extruder with an aqueous solution of diamine in a stoichiometric amount. In the presence of an inert gas, under reduced pressure, the treatment in an extruder allows an increase in the molar mass of the product as far as an inherent viscosity of 0.3-1.2 dl/g.

Patent application JP 7228693 describes the preparation of a semi-aromatic polyamide with terephthalic units, in three steps. During a first step, an oligomer is formed in the reactor, and is then post-condensed into a solid phase in a second step. At the end of this step, its inherent viscosity is greater than 0.3 dl/g. This pre-polymer is then post-condensed in an extruder at a temperature above the melting point of the polyamide, in order to obtain a polyamide with an inherent viscosity of more than 0.8 dl/g.

In patent application JP 4337323, a polyamide resin with a relative viscosity from 1.5 to 2.5 formed from hexamethylene adipamide, hexamethylene terephthalamide and hexamethylene isophthalamide in a reactor is in a second step post-condensed in an extruder with an acid catalyst like phosphoric acid or pyrophosphoric acid.

In U.S. Pat. No. 4,760,129, a polyamide 6-6 of high viscosity (relative viscosity between 4 and 6) is prepared in an extruder from a pre-polymer of a relative viscosity from 2.5 to 2.7. The material successively crosses a series of areas for pressurization by introducing a water vapor flow and of negative pressure areas for applying a reduced pressure. The negative pressure areas correspond to an increasingly small pressure from 500 to 50 mbars.

In patent DE 4 329 676, the polycondensation of an aromatic copolyamide from hexamethylenediamine, isophthalic acid and terephthalic acid, of a relative viscosity in solution of 1.1, is completed in an extruder including several degassing areas under reduced pressure of 10-25 mbars. The obtained polyamide has a relative viscosity index in solution of 1.46.

In patent application WO 93/14145, an aromatic polyamide, polydodecane terephthalamide or derived copolymers are prepared in two steps: a first step in a reactor which leads to the formation of a pre-polymer with reduced viscosity from 0.1 to 0.4 dl/g, and then a second step in a single screw extruder allows increase in the reduced viscosity to at least 0.5 dl/g.

In U.S. Pat. No. 3,040,005, a polyamide (PA 6-6) of high molar mass (39,000 g/mol) is obtained from a pre-polymer of 17,000 g/mol (inherent viscosity of 1.05-1.2 dl/g) with passing in an extruder under reduced pressure in the presence of an inert gas.

In patent application WO 99/61509, a poly(terephthalic amide) (PA 6-T) containing at least 55% of terephthalic units is synthesized in an extruder under reduced pressure, from a PA6T oligomer of an inherent viscosity of less than 0.3 dl/g and from a PA6T oligomer containing up to 50% of terephthalic units of inherent viscosity of at least 0.9 dl/g. The final polyamide thus contains at least 55% of terephthalic units.

These different methods are all based on the optimization of the post-condensation step. All require the introduction into the extruder used of a pre-polymer with sufficient viscosity which has to be prepared beforehand in a reactor. These methods are therefore lengthy and require transfers and handling operations which are not easy to apply on an industrial scale, notably.

Other methods envision the introduction of a nylon salt in an extruder. These methods lead to obtaining polyamides having reduced viscosity indexes of 20-60 ml/g, which is quite low. It is therefore necessary to prepare the nylon salt in a preliminary step and it is this salt which is introduced into the extruder. First of all mention may be made of patent application EP 0 410 650, wherein, after introducing the nylon salt in the presence of a catalyst into a twin screw extruder of 21 D, a pre-polymer of an inherent viscosity index of 35 ml/g corresponding to a molar mass from 3,000 to 5,000 g/mol is obtained by applying temperature and pressure conditions. The originality of this method is based on the use of an anhydrous nylon salt and not of a salt in an aqueous phase as customarily used in batch reactors. The use of a catalyst is required in the described method for accelerating the polycondensation process. It should also be noted that the monomers which make up the initial salt are on one side aromatic diacids and on the other aliphatic, cycloaliphatic or aromatic diamines.

Mention may also be made of patent application WO 96/33234, wherein a nylon salt (PA 6-6) is introduced into a counter-rotating twin screw extruder of length 36 D, D being the diameter of the screws which is equal to 34 mm. The obtained product is directly introduced into a second co-rotating extruder of 40 D (D being the diameter of the screws which is equal to 40 mm) with different pressure areas induced by devices for setting under reduced pressure, in order to obtain a product having a reduced viscosity index from 49 to 62 ml/g. The product obtained at the outlet of the extruder is then post-condensed into a solid phase for 8 hours at 170° C. in order to obtain a polyamide with a reduced viscosity index from 139 to 190 ml/g. In the different examples of this patent application, an anhydrous salt, produced beforehand in an aqueous phase, is introduced into the first counter-rotating extruder. Further, comparative tests show the requirement for using a first counter-rotating extruder in order to obtain polyamides having a viscosity index of more than 40 ml/g. Tests 3a to 3 g, notably, conducted with reactive extrusion circuits on 70 D, by connecting two co-rotating extruders of 30 and 40 D respectively in order to extend the dwelling time, lead to polyamides having a viscosity index of less than 20 ml/g, which demonstrates the requirement of using a counter-rotating extruder in the first reaction phases.

Other documents like document GB 1,289,349 and the publication of S. K. H A et al. describe methods for polymerizing lauryl lactam or methods for copolymerization of lauryl lactam and of caprolactam in a co-rotating twin screw extruder. The polymerization reactions applied in these documents are polymerization reactions by ring opening and are very different from polymerization reactions by polycondensation.

Indeed, polycondensation reactions are stepwise polymerization reactions, wherein the monomers with two or several functional groups react in order to first form dimers, and then trimers or quadrimers, and then more or less long oligomers, in order to subsequently attain long chain polymers.

In polymerization by polycondensation, each step is a condensation reaction which is accomplished with removal of small molecules, called a reaction by-product, such as $H_2O$, HCl, . . . , depending on the monomers set into play. In the case of polycondensation of diamine and carboxylic diacid or further of a single monomer both including a carboxylic acid function and an amine function, such a reaction is accomplished by removal of water, as a by-product of the polycondensation reaction.

This type of reaction is to be distinguished from polymerization reactions with ring opening, as this is the case with polymerizations of caprolactams described in document GB 1,289,349 and the publication of S. K. H A et al., which correspond to chain polymerizations where macromolecules having ended their growth are formed from the onset of polymerization. Chain polymerizations require the presence of an initiator from which is produced a species which has an active centre able to initiate the reaction. Polymerization then continues by propagation of the active centre and by successive addition of a large number of monomer molecules within a very short time. From the onset of the reaction, in a very short time, long polymeric chains therefore form. The growth of the chains is interrupted as soon as the active centre is destroyed by one of the many possible termination reactions.

One of the objects of the present invention is to propose a method for preparing polyamides by polycondensation which is simpler and faster than the solutions proposed by the prior art.

In this context, the object of the present invention is a method for preparing a polyamide from one or several monomers suitable for preparing a polyamide characterized in that the monomer(s) is(are) introduced into an extruder including at least two conveying screws rotating co-rotatively, and in that all the reaction and polycondensation steps, initially starting with the selected monomer(s), and giving the possibility of ending up with the desired polyamide, are led into an extruder including at least two conveying screws rotating co-rotatively. Polycondensation is achieved by carrying out at least two discharge operations of the by-product(s) formed by the polycondensation reaction. When the polycondensation is carried out with carboxylic diacid and diamine monomers or further with a single monomer having both a carboxylic acid function and an amine function, the by-product formed is water.

Within the scope of the invention and this advantageously, the monomers are introduced, without any preliminary reaction and without any preliminary preparation of the corresponding salt.

The method according to the invention may advantageously replace traditional methods for producing polyamides by saving energy, reducing the size of the plants and the level of investments, by increasing productivity, but especially by reducing industrial risks since the reaction occurs in a thin and confined layer and no longer in volumes of several cubic meters under pressures of several bars.

In an extruder, the reaction medium is confined in a metal confinement casing. The ratio of the section of the unstable reaction medium and of the metal confinement casing is generally of at most 0.5% as a maximum, so that the casing is at least 200 times more resistant to the pressure generated by the reaction than that of traditional methods for polycondensation of polyamides. The reaction cannot run out of control since the inertial casing temperature mass is 1600 times greater than the reaction mass.

This method also gives the possibility of testing the synthesis of new polymers and then passing very easily and rapidly from a pilot scale to production.

The invention also relates to extruders adapted for applying such a method.

Preferably, the average degree of polymerization ($DP_n$) of the polyamide obtained according to the method of the invention is at least equal to 50, preferably at least equal to 60, preferentially at least equal to 70, and still preferentially at least equal to 100. By average degree of polymerization, is meant the average number of structural units present in a polymer chain. The average degree of polymerization is typically evaluated from the number average molar mass ($M_n$) of the polyamide according to the following formula:

$$DP_n = \frac{M_n}{M_0}$$

with, $M_0$ is the average of the molar masses of the monomers, $M_n$ is the number average molar mass of the polyamide.

The molar masses of the polyamides are conventionally determined by steric exclusion chromatography, for example by using as an elution solvent, 1,1,1,3,3,3-hexafluoro-2-propanol. As an example, the polyamides are dissolved in this same solvent at a concentration of 1 mg·ml$^{-1}$ and the elution flow rate is 0.75 ml·min$^{-1}$. The polymer used for the calibration between the molar mass and the elution time is for example poly(methylmethacrylate).

This method allows determination of the number average molar masses Mn and mass average molar masses Mw and the polydispersity index of a given polymer.

Advantageously, the polyamide obtained according to the method of the invention has a mass average molar mass (Mw) at least equal to 14,000 g/mol, preferably at least equal to 20,000 g/mol, and preferentially belonging to the range from 30,000 to 100,000 g/mol and/or a viscosity index at least equal to 80 ml/g, preferably at least equal to 100 ml/g, and preferentially belonging to the range from 120 to 250 ml/g.

The viscosity index («viscosity number: VN») may be determined according to the Directives of the ISO 307:2007 standard. Such a viscosity index is preferably measured at 25° C., for example by using the following conditions: The solvent used for forming the solutions of the polyamide, the viscosity of which is to be measured, is a mixture of phenol and of dichlorobenzene with a mass distribution of 50% each. The polyamide is dissolved at 135° C. for 45 minutes for a final concentration of 5 mg·ml$^{-1}$. After cooling to room temperature, the flow times of the solutions of polymers and of the solvent mixture alone are measured at 25° C. in a thermostated bath by means of a viscometer of the Ubbelohde type including a capillary with an inner diameter of 1.03 mm+/−2% (ISO3105 standard).

It is recognized by the ISO 307:2007 standard that the ratio of the flow times between the solvent and a polymer solution in this same solvent is equal to the viscosity ratio between the solvent ($\eta_0$) and the polymer solution ($\eta$). Therefore, the viscosity index (VN) may be computed from this ratio according to the formula:

$$VN = \left(\frac{\eta}{\eta_0} - 1\right) * \frac{1}{c}$$

wherein $\eta/\eta_0$ is the relative viscosity of the polymer solution in the solvent used, c is its concentration in mg/ml.

The description which follows, with reference to the appended Figures, allows a better understanding of the invention.

The monomers adapted for forming polyamide by polycondensation may be:

Either a single monomer both including a carboxylic acid function and an amine function, of the amino-acid type;

or at least two monomers, one bearing two amine functions and the other one two carboxylic acid functions or an equivalent monomer of the acid dichloride or acid anhydride type. Most often, a pair of diamine/diacid monomers, diamine/acid dichloride or diamine/acid anhydride monomers will be used, although the use of a mixture of diamine monomers and a mixture of monomers of the diacid type and/or a further monomer of the amino-acid type is not excluded.

By an amino-acid monomer, is meant a molecule, at least partly a hydrocarbon molecule with an amine function and a carboxylic function generally comprising from 2 to 40 carbon atoms.

By diamine monomer, is meant a molecule, at least partly a hydrocarbon molecule with two amine functions generally comprising from 2 to 40 carbon atoms.

By diacid monomer, is meant an at least partly hydrocarbon molecule with two carboxylic acid functions generally comprising from 2 to 40 carbon atoms.

By acid dichloride monomer, is meant an at least partly hydrocarbon molecule with two acid chloride functions generally comprising from 2 to 40 carbon atoms.

By acid anhydride monomer, is meant an at least partly hydrocarbon molecule with one or two acid anhydride functions generally comprising from 2 to 40 carbon atoms.

A pair of diamine/diacid monomers will preferably be used.

Within the scope of the invention, it is possible to use diamine, diacid, acid dichloride, acid anhydride and/or amino-acid monomers which are aromatic, semi-aromatic or aliphatic. The acids used are for example succinic acid, glutaric acid, adipic acid, pimelic acid, suberic acid, azelaic acid, sebacic acid, undecanedioic acid, 1,12-dodecanedioic acid, dioleic acid, phthalic acid, terephthalic acid, isophthalic acid, 5-sulfoisophthalic acid, fatty acid dimers or mixtures of such dicarboxylic acids. It is notably possible to use, as a diamine, ethylenediamine, propane-1,3-diamine, tetramethylene diamine, pentane-1,5-diamine, hexamethylene diamine, octamethylene diamine, decamethylene diamine, dodecamethylene diamine, m-xylylene diamine, bis-(4-aminophenyl)methane, bis-(4-aminophenyl)propane-2,2,bis-(4-aminocyclohexyl)methane, metaphenylenediamine, paraphenylenediamine, 2,2,4 or 2,4,4-trimethylhexamethylenediamine or mixtures of such diamines. In particular, the method according to the invention is perfectly adapted to applying aliphatic monomers, whether these are diamines or diacids (or acid dichlorides or acid anhydrides) known to be less reactive than aromatic monomers.

The monomer(s) introduced into the extruder preferably contain a water content of less than 5% by mass, preferentially less than 1% by mass, more specifically less than 0.6% by mass. An initial low water content in the selected monomer(s) promotes progression of the reaction since the amount of water to be removed during the method will be reduced.

The monomer(s) used are therefore advantageously kept under an inert atmosphere, for example under a nitrogen, argon or helium atmosphere, before their introduction into the extruder. The gas used is preferably nitrogen. The use of an inert gas gives the possibility of avoiding oxidation of the monomers, especially if they are introduced under hot conditions. Further, this also allows limitation of the introduction of oxygen into the extruder, in order to reduce the risks of oxidation of the monomers, oligomers, pre-polymer and polymer during the process. Such an oxidation would be detrimental to the progression of the reaction, since it would unbalance the desired stoichiometric ratio and programmed within the scope of the method.

Within the scope of the invention, a method for preparing polyamides from one or several monomers, and in particular of a pair of diamine and diacid monomers, acid dichloride or acid anhydride monomers, exclusively by reactive extrusion is proposed. Such a method entirely achieved in an extruder gives the possibility of leading to polyamides corresponding to a so-called extrusion or injection grade. Within the scope of the method according to the invention, the desired polyamide, in particular corresponding to an average degree of polymerization, to a molar mass and/or to a viscosity index already mentioned, is obtained directly at the outlet of the extruder, without applying a subsequent additional condensation step achieved outside the extruder. No additional heat treatment such as an annealing in a solid phase is required for obtaining the polyamide having the desired properties.

Further, no preliminary step for preparing a salt or a prepolymer is required. The selected monomer(s) are directly introduced into the extruder. The extruder includes a first area for introducing the monomer(s). When several monomers are introduced, notably in the form of a pair of diamine/diacid, diamine/acid dichloride or diamine/acid anhydride monomers, which is the most frequent case, the different monomers may be incorporated at a same inlet or else at distinct inlets. Advantageously, whether one or several inlets are provided, the extruder is fed in an independent way, with each of the monomers used. The monomer supply flow rate is controlled independently, it is thus possible to control the progression of the reaction and the acid/amine ratio, in particular at the terminal functions, of the final polyamides.

The total monomer supply flow rate (i.e. the sum of the monomer flow rates if several inlets are present) will typically vary from 2 to 480 kg/h, and will be adjusted depending on the length and on the diameter of the extruder used. In so far that the by-product(s) formed by the polycondensation reaction is(are) removed during the dwelling time in the extruder and that a loss of monomers may occur during degassing operations and that the initial monomers may contain water removed with the by-product(s), the supply flow rate is greater than the production flow rate. The amount of by-product(s) depends on its nature ($H_2O$, HCl and organic acid) and on the molar mass of the initial monomers. In the majority of the cases, the production flow rate will correspond to 65%-98% of the total monomer supply flow rate.

The selected monomer(s), and in particular the diamine and the diacid (or the acid dichloride or acid anhydride), are introduced into the extruder under hot conditions or at room temperature. They may be introduced in solid form, notably in the form of granules, flakes, powder or any other solid form, or further in a molten state in liquid form. In this case, they are heated to a temperature above their melting temperature and in particular greater by 5° C., and more specifically greater by 10° C. An introduction of the selected monomer(s) into the extruder in a liquid molten form is preferred for the following reasons:

Better control of the stoichiometry is possible, notably by carrying out the supply of monomer(s) to the extruder, by means of a supply device such as a pump coupled with a mass flowmeter. The supply device used preferably allows a control of the flow rate with a maximum deviation of 0.5% by mass, preferably a maximum of 0.1% by mass. These conditions facilitate the obtaining in a reproducible way of the polyamides which may attain a mass average molar mass of at least 14,000 g/mol, preferably at least equal to 20,000 g/mol, and preferentially at from 30,000 to 100,000 g/mol, with a control of the acid or amine nature of the terminal functions.

The amount of oxygen present in the material is reduced, which facilitates inertization of the monomer(s) before their introduction into the extruder.

When the monomer(s) is(are) in liquid form, mixing is faster.

Preferably, the method for preparing a polyamide according to the invention includes the following successive steps, all carried out within the extruder:

a step for mixing the selected monomer(s), and a polycondensation step conducted by successively achieving shearing and depressurization operations on the material conveyed by the conveying screws.

Preferably, it is also proceeded with a step for forming a plug or a continuously renewed material gasket by conveying the material on the conveying screws, between the mixing and polycondensation steps. Advantageously, the plug or gasket consisting of the material in progress fills the whole available space for letting through the material and forms an area which is hermetic to vapors, and notably to monomer vapors which may be generated.

Also, several extrusion areas are in succession, in order to produce according to a continuous method, the desired polyamide: an area ($Z_0$) for introducing the monomer(s), followed by a mixing area ($Z_1$) for the monomer(s), preferably followed by an isolation area ($Z_2$) allowing the formation of a continuously renewed material plug by conveying the latter, followed by a polycondensation area ($Z_3$). The plug formed by the material makes the passage for the material hermetic to vapors of monomers which are volatile under the extrusion conditions used in the mixed polycondensation area, or even under the temperature conditions used in the mixing area, and thus allows preservation of the stoichiometry in the polycondensation area, in spite of the fact that the temperature of the extruder exceeds the evaporation temperatures of said monomers. Thus, the isolation area ($Z_2$) gives the possibility of avoiding the passage of vapors of monomers which may occur from the mixing area ($Z_1$) to the polycondensation area ($Z_3$) or from the polycondensation area ($Z_3$) to the mixing area ($Z_1$).

Figure 1:
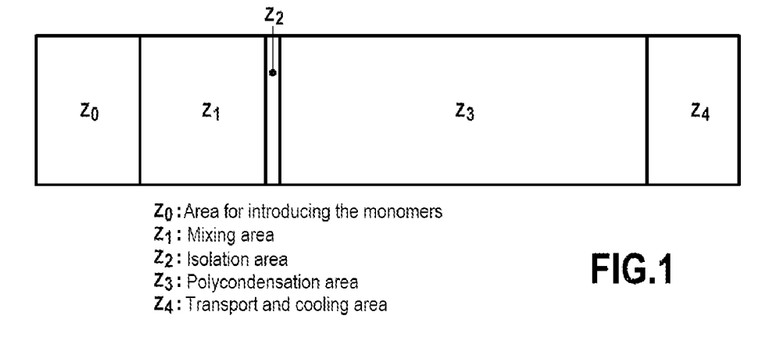
FIG. 1 is a schematic illustration of the various areas of an extruder used within the scope of the invention.

These areas are in succession in the direction for conveying the material during the extrusion. Depending on the relevant area, the material in progress will consist of monomer(s), an oligomer, prepolymer, polymer with a more or less high degree of polycondensation, but optionally as a mixture. The polycondensation area ($Z_3$) may advantageously be followed by a transport and cooling area ($Z_4$). Such a sequence is schematically shown in FIG. 1.

Preferably, within the scope of the invention, all the reaction and polycondensation steps giving the possibility of ending up with the desired polyamide from the selected monomer(s) are achieved in a single extruder. Advantageously, the area for introducing the monomer(s), the area for mixing the monomer(s), the isolation area allowing a material plug to be formed during conveyance when it is present, and the polycondensation area, or even the final transport and cooling area when it is present, are gathered in a single extruder. The area for introducing the monomer(s) is then located at the inlet of the extruder and the desired polyamide is recovered at the outlet of the extruder, after the polycondensation area, or even the transport and cooling area.

Of course, it will be possible to perform these different steps in two co-rotating extruders positioned in series by segmenting the polycondensation area notably.

Figure 2:
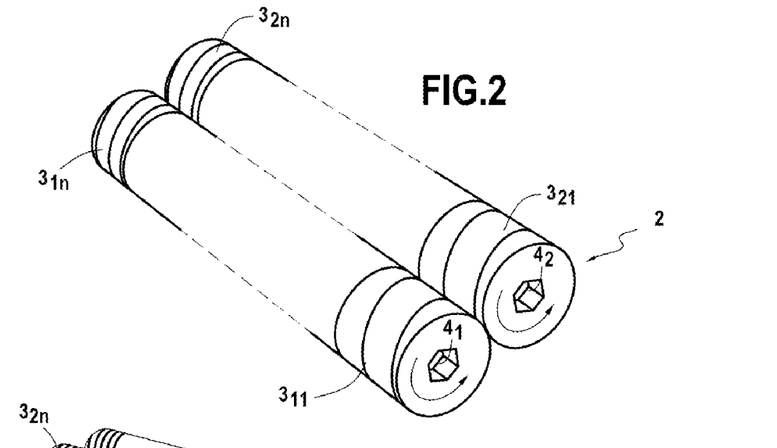
FIGS. 2 and 3, are schematic perspective illustrations of the conveying screws, respectively in the case of a co-rotating twin screw extruder and a co-rotating 12-screw extruder.
Figure 3:
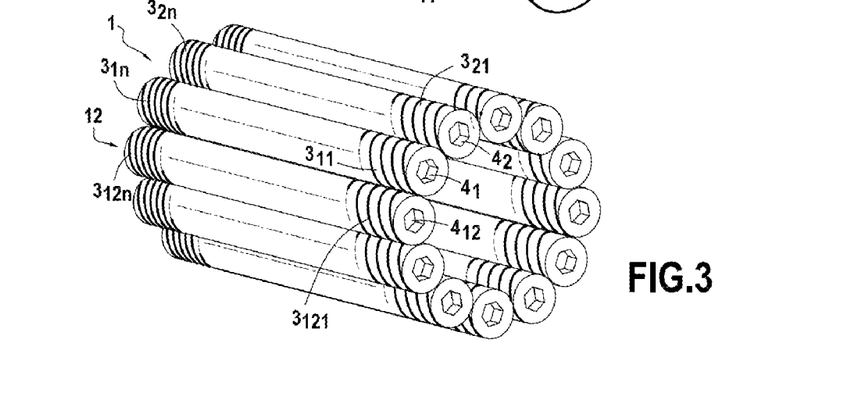

In an extruder, each conveying screw consists of different elements in succession along the conveying direction. These different elements are placed beside each other on a rotation shaft. In a co-rotating extruder all the conveying screws rotate in the same direction, which most often corresponds to the anti-clockwise direction. The elements are located beside each other on a same line in the case of a linear extruder, or on a circle in the case of an annular extruder. The different constitutive conveying screws of an extruder all have a same diameter which remains constant all along the conveying screw. Most often, this diameter belongs to the range from 6 to 134 mm. In general, the elements located in a same plane transverse to the conveying direction are all identical. FIG. 2 schematically illustrates both conveying screws 1 and 2 of a twin screw extruder, each consisting of a series of elements noted as $3_{11} \ldots 3_{1n}$ and $3_{21} \ldots 3_{2n}$ respectively mounted on the shafts $4_1$ and $4_2$. FIG. 3, as for it, schematically illustrates the 12 conveying screws 1 to 12, of a 12-screw extruder, each consisting of a series of elements noted as $3_{11} \ldots 3_{1n}, 3_{21} \ldots 3_{2n}, \ldots 3_{121} \ldots 3_{12n}$ respectively mounted on the shafts $4_1, 4_2 \ldots 4_{12}$ of each of the 12 screws.

The speed of rotation of the conveying screws depends on the nature of the extruder, but is identical for all the constitutive screws of the extruder. The speed of rotation of the screw will generally be from 50 rpm to 6,000 rpm depending on the extruder.

When several monomers, and in particular a pair of aforementioned monomers are used, the monomers may be introduced into the extruder, with an excess of the most volatile monomer, typically the diamine. Indeed, this excess may be required for compensating the losses of volatile monomer which may occur along the extruder. This compensation may prove to be necessary in order to attain high progressions in the polycondensation reaction. The stoichiometric ratio of the introduced monomers may for example vary from 1.2 to 0.8, typically from 1.1 to 0.9. Therefore, advantageously a stoichiometric excess of the most volatile monomer will be used, corresponding to a stoichiometric ratio which may range up to 1.2.

The introduction of the monomers into the introduction area may be directly carried out with the selected stoichiometric excess. It is also possible to carry out the introduction of the monomers in the introduction area with a stoichiometric ratio of 1 and to subsequently introduce the monomer which has to be introduced in excess. Such an introduction may notably be achieved in the polycondensation area, preferably before the last present shearing segment.

The use of an excess of one of the two monomers notably allows limitation, if this is desired, of the final molar masses and/or generation of polyamides which are acid or amine functionalized.

The extruder used within the scope of the invention has the required sequences for giving the possibility of performing:

the mixing of the introduced monomer(s), and then preferably forming a continuously renewed material plug and making the passage for the material hermetic to the vapors; and finally sufficient polycondensation for attaining the desired polyamide, with operation for removals of the by-product(s) formed by polycondensation.

A transport element corresponds to a unit screw element with 1, 2 or 3 threads (mono-, bi- or tri-lobed) with a more or less significant pitch. A transport element may be designated in the following way:

S X/A/Y: a transport element with a thread which turns towards the right (A=R) corresponding to the clockwise direction or towards the left (A=L) corresponding to the anticlockwise direction (which most often corresponds to the direction of rotation of the conveying screws) and with a pitch of X mm with an element of length Y mm.

An element turning in the direction opposite to the direction of rotation of the conveying screws (an element of type R in the case when the conveying screws turn in the anticlockwise direction), will facilitate the transport of the material in the conveying direction when an element turning in the direction of rotation of the conveying screws (element of type L in the case when the conveying screws turn in the anticlockwise direction), will oppose transport of the material in the conveying direction.

An element turning in the direction opposite to the direction of rotation of the conveying screws is called a <<direct element>> and an element turning in the direction of rotation of the conveying screws is called a <<reverse element>>.

Figure 4:
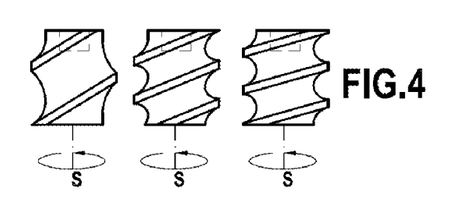
FIG. 4 illustrates examples of various transport elements which may be used within the scope of the invention on the conveying screws.

In FIG. 4, direct transport elements in the case when the conveying screws turn in the anticlockwise direction with different pitches are illustrated.

Examples of transport elements in the direction of conveyance of the material (direct transport), in the case when the conveying screws rotate in the anticlockwise direction, may be designated as follows:

S 26/R/26 (also designated as 1 D) corresponds to a direct transport element towards the right with a pitch of 26 mm, and a total length equal to the diameter of 26 mm.

S 19.5/R/26 (also designated as 0.75 D) corresponds to a direct transport element with a pitch of 19.5 mm, and a total length equal to the diameter of 26 mm.

S 39/R/26 (also designated as 1.5 D) corresponds to a direct transport element with a pitch of 39 mm, and a total length equal to the diameter of 26 mm.

Within the scope of the invention, transport elements with two threads (bi-lobed) are preferred.

A shearing element corresponds to a <<kneading block>> consisting of a sequence of mono-, bi- or tri-lobed fins, the fins being angularly shifted relatively to each other along the direction of rotation of the element. It may include from 4 to 9 fins. The fins may be shifted by a more or less large angle. This angle may notably be 30, 45, 60 or 90 degrees. Such an element allows mixing of the material and facilitates its operation and therefore the reactions which should occur.

Within the scope of the invention, a shearing element consisting of bi-lobed fins is preferred.

Figure 5:
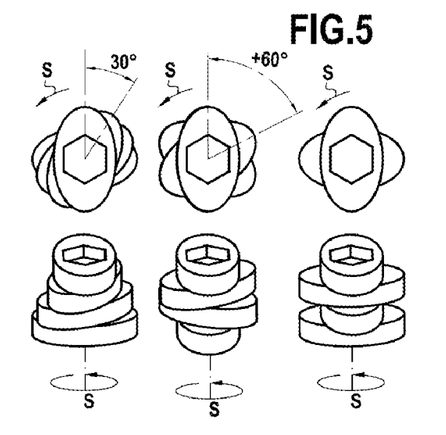
FIG. 5 illustrates examples of different shearing elements which may be used within the scope of the invention on the conveying screws.

FIG. 5 shows from left to right, shearing elements according to a front view (upper) and a profile view (lower) each comprising four fins shifted by an angle of 30°, 60° and 90° in the clockwise direction (shifted towards the right), therefore opposite to the direction S of rotation of the screws when the latter rotate according to the anticlockwise direction, and which facilitates transport of the material in the conveyance direction.

The shearing elements may be designated as follows:

KB X/Y/A/Z: Shearing element (<<Kneading Block>>: KB) with Y fins shifted by an angle of X° between them towards the right (A=R) or towards the left (A=L), on an element of total length of Z mm.

KB 30/4/R/26 (also designated as 30° 1 D) corresponds to a shearing element with four fins shifted by an angle of 30° relatively to each other towards the right, and a total length equal to the diameter of 26 mm.

KB 60/4/R/26 (also designated as 60° 1 D) corresponds to a shearing element with four fins shifted by an angle of 60° relatively to each other towards the right, and a total length equal to the diameter of 26 mm.

KB 90/4/R/26 (also designated as 90° 1 D) corresponds to a shearing element with four fins shifted by an angle of 90° relatively to each other, and a total length equal to the diameter of 26 mm.

A retention element is an element which gives the possibility of slowing down the material and therefore has a compression action on the latter. This may be a shearing element with fins angularly shifted relatively to each other in the direction of rotation of the conveying screws. This may also be a reverse transport element turning in the direction of rotation of the conveying screws.

Within the scope of the invention, a shearing element therefore refers to a shearing element which turns in the direction opposite to the direction of rotation of the conveying screws (rather than referring to a direct shearing element), on the other hand, by retention element will be designated a shearing element which turns in the direction of rotation of the conveying screws (rather than referring to a reverse shearing element).

Also, one will refer to a transport element when the latter turns in the direction opposite to the direction of rotation of the conveying screws (rather than referring to a direct transport element), on the other hand, by retention element will be designated a transport element which turns in the direction of rotation of the conveying screws (rather than referring to a reverse transport element).

Figure 6:
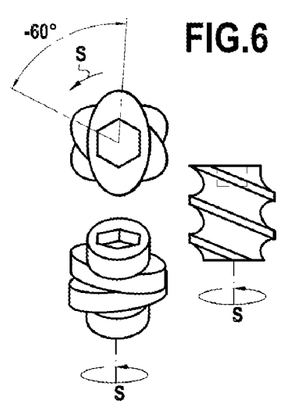
FIG. 6 illustrates examples of two retention elements which may be used within the scope of the invention on the conveying screws.

FIG. 6 shows, from left to right, a shearing element according to a front view (upper) and to a profile view (lower) comprising four fins shifted by an angle of 60° in the anticlockwise direction (shifted towards the left), therefore in the direction S of rotation of the screws when the latter rotate according to the anticlockwise direction, and a transport element for which both threads turn in the anticlockwise direction (towards the left), therefore also in the direction S of rotation of the screws.

Therefore they correspond to a retention element which corresponds to a shearing retention element in the first case and to a reverse transport element in the second case.

An example of a shearing retention element may be designated as follows, in the case when the conveying screws rotate in the anticlockwise direction:

KB 60/4/L/26 (also designated as rev 60° 1 D) corresponds to a shearing retention element with four fins shifted by an angle of 60° relatively to each other towards the left, and with a total length equal to the diameter.

An example of a reverse transport element may be designated as follows, in the case when the conveying screws rotate in the anticlockwise direction:

S 26/L/26 (also designated as rev 1 D) corresponds to a reverse transport element with a pitch of 26 mm, and a total length equal to the diameter.

Such a nomenclature is the one used by providers of screw and extruder elements such as Extricom GmbH Blach Extruder & Components.

Other elements capable of transporting, shearing and/or retaining material known to one skilled in the art, may also be used. As one skilled in the art is capable of evaluating the various transport, shearing and retention capacities for the material of a screw element, they will be selected accordingly.

Preferably, the extruder used in the method according to the invention includes, on each conveying screw which makes it up, at least several segments each linking at least two shearing elements and a retention element. In particular, the extruder used includes, in the mixing area, transport elements, on each conveying screw. Advantageously, these transport elements may be followed by at least one and notably one or two, shearing segment(s) linking at least one, notably at least two or even three, shearing elements. When several shearing elements are in succession, they will preferably have fins shifted by an angle which increases according to the direction opposite to the direction of rotation of the conveying screws, in the conveying direction of the material.

Figure 7:
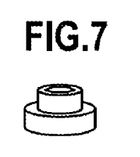
FIG. 7 illustrates an example of an element for shrinking the passage for the material which may be used within the scope of the invention on the conveying screws.

Advantageously, on each conveying screw, the isolation area consists of one or several elements for shrinking the passage for the material, commonly called a plug by the expert on extrusion elements. An example of such an element, for which the portion corresponding to the shrinkage has a length of 0.5 D, is shown in FIG. 7. Such an element for shrinking the passage section for the material gives the possibility of avoiding losses of volatile monomer, especially when it is close to a device for removing the formed reaction by-product(s) (which is water in the majority of the cases), present in the polycondensation area which follows. The isolation area is an area where the material continues to advance but fills the whole available space for its passing, avoiding passage of vapor. This is why, it is indicated that in this area, a plug of material continuously renewed by conveyance of the material is formed.

This isolation area may also be formed by a succession of at least two retention elements generating an accumulation of material which will then fill the whole space corresponding to the available passage, thereby allowing the same function to be fulfilled as an element for shrinking the passage for the material.

The formation of the plug of material is achieved, after introduction and transport ensuring the mixture of the monomer(s) at the inlet of the extruder. In the area for mixing the monomer(s), and then in the isolation area causing the formation of a plug of material which follows it, the selected monomer(s) is(are) transported and then sheared, at a temperature above their melting temperature. Typically, in the mixing area and in the isolation area when it is present, the material is maintained at a temperature at least 5° C. above the melting temperature of the monomer having the highest melting temperature (or of the single monomer used, in the case of the use of a single amino-acid monomer), while not being greater by at most 100° C. relatively to the melting temperature of the monomer having the highest melting temperature. I.e. that, during the step for mixing the monomer(s) and the step for forming the plug when it is present, the material is maintained at a temperature by at most 100° C. greater than the melting temperature of the monomer having the highest melting point and greater by more than 5° C. In the mixing area and in the isolation area, a temperature rise gradient is preferably used. At the outlet of the isolation area, the mixture will for example be found at a temperature by at least 20° C. greater, than the temperature of the area for introducing the monomer(s).

Each conveying screw preferably includes, in the polycondensation area, at least three, notably three, four, five or six, and preferably at least four shearing segments, successively linking each of at least two shearing elements and a retention element. Preferably, in these shearing segments, the fins will be shifted by an increasing angle along the direction opposite to the direction of rotation of the conveying screws, in the conveying direction of the material. Such a shearing segment advantageously corresponds to the linking of a shearing element including 4 fins shifted by an angle of 60° according to the direction opposite to the direction of rotation of the conveying screws, of a shearing element including 4 fins shifted by an angle of 90° according to the direction opposite to the direction of rotation of the conveying screws, so as to convey the material in the conveying direction, and a retention element which may notably be a reverse transport element or a shearing element including 4 fins shifted by an angle of 60° along the direction of rotation of the conveying screws.

More advantageously, each conveying screw includes, and preferably in an additional way to the shearing segments described earlier, in the polycondensation area, at least one shearing segment successively linking at least three shearing elements and a retention element. Preferably, the fins will be shifted by an angle increasing from the first to the third shearing element according to the direction opposite to the direction of rotation of the conveying screws so as to convey the material in the conveying direction. Such a shearing segment advantageously corresponds to the link of a shearing element including 4 fins shifted by an angle of 30° according to the direction opposite to the direction of rotation of the conveying screws, of a shearing element including 4 fins shifted by an angle of 60° along the direction opposite to the direction of rotation of the conveying screws, of a shearing element including 4 fins shifted by an angle of 90° according to the direction opposite to the direction of rotation of the conveying screws, so as to convey the material in the conveying direction, and of a retention element which may notably be a reverse transport element or a shearing element including 4 fins shifted by an angle of 60° along the direction of rotation of the conveying screws, so as to retain the material.

The method according to the invention applies at least two steps for removing by-products formed during the polycondensation reaction within the extruder. Also, the extruder is also equipped with at least two devices for discharging the reaction by-product(s) formed by the polycondensation reaction (which is water in the majority of the cases). Such devices are also referred to, in the continuation of the description, as degassing devices. These devices are generally located in the polycondensation area. Such a device may notably be provided between two shearing segments. They will be positioned at a transport element, preferably with a wide helical pitch. Such a device may also be located in the mixing area. A device for removing the formed polycondensation by-product(s), and notably the water formed, may consist of an outlet on the outside at atmospheric pressure, or preferably of an outlet connected to a device allowing a negative pressure area to be generated in the extruder, such as a vacuum pump. Such a device notably gives the possibility of producing a reduced pressure, for example from 0.001 mbars to 500 mbars, and typically from 0.01 to 200 mbars at the element of the extruder to which it is connected.

The water vapor, or more generally the reaction by-product(s) generated by the polycondensation reaction, and the materials with a higher boiling point like the monomers and the oligomers, which are thus removed, may be separated by conventional distillation devices. The monomer(s) and/or the oligomers recovered during this separation may be re-introduced.

Advantageously, the extruder is equipped with at least two devices for discharging the water formed by the polycondensation reaction, and more generally reaction by-product(s) generated by the polycondensation reaction, integrating a system which allows re-injection into the extruder, of the monomer(s) carried away with the water formed, or more generally with the reaction byproduct(s) generated by the polycondensation reaction. Such devices for example include a distillation system or a side-feeder which allows generation of a negative pressure area.

Preferably, the devices for discharging the water formed by the polycondensation reaction (or more generally of the reaction by-product(s) generated by the polycondensation reaction), integrating a system which allows re-injection, into the extruder, of the monomer(s) carried away with the water formed allowing generation of a negative pressure area. Provision may also be made for surrounding the outlet connected to a device for generating a negative pressure area, with two elements for shrinking the passage for the material, in order to further limit the loss of monomers and/or prepolymer.

The shear and negative pressure areas, or more generally the whole of the polycondensation area, is maintained at a temperature above the temperatures of the mixing area and of the isolation area, which preferably belongs to the range from 150 to 350° C., and preferably of 250 to 320° C. I.e. that during the polycondensation step, the material is maintained at a temperature greater than the temperatures applied during the steps for mixing and forming the material plug, which for example belongs to the range from 150 to 350° C., and preferably of 250 to 320° C.

Of course, the optimum temperature will be adjusted by one skilled in the art, depending on the monomer(s) set into play and on the desired average degree of polymerization. It is possible that the last shearing segment of the polycondensation area be maintained at a lower temperature than the preceding segments, for example at a temperature lower by 10° C., typically 20° C., than that of the preceding shearing and negative pressure areas.

It may also be advantageous for the extruder to include one or several inlets for an anhydrous inert gas such as nitrogen or argon. Such an inlet may be provided at the area for introducing the monomer(s) and/or before the water removal devices (or more generally for removing the reaction by-product(s) generated by the polycondensation reaction), in the polycondensation area. This gives the possibility of improving the removal of the water formed during the process since the anhydrous inert gas will be loaded with water, and thereby promote its removal. This introduction of nitrogen also allows limitation of the degradation during the polycondensation reaction.

Advantageously, the conveying screws will end by a transport and cooling area. This transport area will be maintained at a temperature below the temperature of the last segment of the polycondensation area, at a temperature lower by 10 to 20° C. than the temperature of the last segment of the polycondensation area. The transport and cooling area may comprise at least one retention element for further increasing the degree of polymerization. This area preferably will include a degassing device in order to facilitate and stabilize the output of material, by means of a reduction of the presence of vapor, at the die, most often present at the outlet.

At the outlet of the extruder, any granulation system known to one skilled in the art may be used such as granulation under water or under air. It is advantageous to have a gear pump followed by a filtration system, at the material output before the granulation system. The gear pump gives the possibility of controlling the material flow upstream from the die and stabilizing the output flow rate. Such a gear pump is called a discharge pump.

The extruder used within the scope of the invention includes a sequence of elements allowing the polycondensation reaction to be conducted for sufficient time in order to attain the desired average degree of polymerization at the extruder outlet. The sequence of these elements will be adapted by one skilled in the art, notably depending on the monomer(s) used and on the desired average degree of polymerization.

Advantageously, the extruder used in the method according to the invention includes, on each conveying screw which makes it up, at least 14 transport elements, and preferably at least 25 transport elements, at least 18 shearing elements, and preferably at least 37 shearing elements, and at least 6 retention elements, and preferably at least 15 retention elements. Preferably, the extruder used will include on each conveying screw which makes it up, at least one, or even two, three or four, elements for shrinking the passage for the material.

The length of the extruder used and of its constitutive elements is selected so as to be able to obtain a sufficient dwelling time in order to obtain the desired polyamide. In particular, it was shown that it was preferable to use an extruder selected from:

twin-screw extruders having a working length of at least 50 D, typically greater than or equal to 70 D, advantageously greater than or equal to 90 D, and very advantageously greater than or equal to 120 D, planar 3-screw extruders having a working length of at least 33 D, typically greater than or equal to 40 D, advantageously greater than or equal to 50 D, and very advantageously greater than or equal to 80 D, planar 4-screw extruders having a working length of at least 24 D, typically greater than or equal to 30 D, advantageously greater than or equal to 40 D, and very advantageously greater than or equal to 60 D, planar 6-screw extruders having a working length of at least 16 D, typically greater than or equal to 20 D, advantageously greater than or equal to 25 D, and very advantageously greater than or equal to 40 D, planar 8-screw extruders having a working length of at least 12 D, typically greater than or equal to 15 D, advantageously greater than or equal to 20 D, and very advantageously greater than or equal to 30 D, annular 4-screw extruders having a working length of at least 36 D, typically greater than or equal to 44 D, advantageously greater than or equal to 56 D, and very advantageously greater than or equal to 88 D, annular 6-screw extruders having a working length of at least 29 D, typically greater than or equal to 36 D, advantageously greater than or equal to 46 D, and very advantageously greater than or equal to 72 D, annular 8-screw extruders having a working length of at least 24 D, typically greater than or equal to 28 D, advantageously greater than or equal to 36 D, and very advantageously greater than or equal to 56 D, annular 10-screw extruders having a working length of at least 19 D, typically greater than or equal to 24 D, advantageously greater than or equal to 31 D, and very advantageously greater than or equal to 48 D, and annular 12-screw extruders having a working length of at least 14 D, typically greater than or equal to 16 D, advantageously greater than or equal to 32 D, and very advantageously greater than or equal to 40 D.

D represents the diameter of the conveying screws. The working length within an extruder may be defined as the length of the segments exclusively consisting of shearing elements and of retention elements and including a successive sequence of at least four of these elements.

Such working length notably, with a succession of shearing areas for the material and negative pressure areas in the polycondensation area, gives the possibility of attaining sufficient reaction times and desired average degrees of polymerization.

The dwelling time in the extruder of the material will preferably be greater than or equal to 3 or 4 minutes, and notably from 3 to 30 minutes and typically from 6 to 20 minutes, depending on the number of conveying screws present in the extruder.

Advantageously, the extruder is an extruder including more than two conveying screws. The use of such an extruder will further allow reduction in the required working length, in order to obtain polyamides with an equivalent or greater degree of polymerization, this while obtaining an equivalent or greater flow rate. Such multiple screw extruders have several advantages as compared with a twin-screw extruder.

In the areas for passing from one screw to the other corresponding to the interpenetration areas, the distributive and dispersive mixture will be more significant than for a twin-screw. These passage areas are areas of elongational shear and areas for compression and decompression of the material. As the number of such areas is greater than for a twin-screw extruder, the material will dwell therein for a longer time. Also, with an identical dwelling time, the frequency of the material passing into the shearing areas increases with the number of conveying screws. For example, according to an empirical approach, this passage frequency was evaluated as being 3 times greater in the case of an annular 12-screw extruder, as compared with a twin-screw extruder.

The extraction of water (or more generally of reaction by-product(s) generated by the polycondensation reaction), will be more efficient in a multi-screw extruder than in a twin-screw extruder. Renewal of the material and the material exchange surface area/reduced pressure ratio over the material volume will be more significant.

The introduction of the monomer(s) is facilitated since the available surface area at the introduction area is more significant on a multi-screw extruder than on an equivalent twin-screw extruder.

As examples of multi-screw extruders available on the market, mention may be made of the annular 12-screw extruder, <<ring extruder>> (RE) from Extricom and the linear 4 and 8-screw extruders from the WDR range of Technovel.

The production throughputs which may be attained with the method according to the invention depend on the extruder used. In particular, the polyamide product throughputs vary from 2 to 15 kg/h on a twin-screw extruder of diameter D 26 mm, from 3 to 110 kg/h on an extruder with a diameter D of 32 mm of length 110 D and from 100 to 300 kg/h on an extruder of diameter D 43 to 60 mm. The material throughputs range from 5 to 40 kg/h on a 12-screw extruder of diameter D 18 mm and of a length 34 D and from 10 to 80 kg/h for a length of 40 D.

The method according to the invention may use or not use a catalyst. If a catalyst is used, it may be introduced separately or as a mixture with a monomer. Its introduction may be accomplished in the area for introducing the monomer(s), or in a subsequent working area, or further in two locations: for example, in the area for introducing the monomer(s), and then in a subsequent working area.

The catalyst may typically be: a pentavalent phosphorus-based compound such as phosphoric acid ($H_3PO_4$), phosphorous acid ($H_3PO_3$), hypophosphorous acid ($H_3PO_2$), phenylphosphinic acid ($H_2PO_3Ph$), poly-phosphoric acids such as phosphoric anhydride, tetrapolyphosphoric acid, pyrophosphoric acid ($H_4P_2O_7$), trimetaphosphoric acid, phosphoric pentachloride, a phosphorous ester such as triphenyl phosphite ($P(OPh)_3$), a hypophosphite such as ammonium hypophosphite, sodium hypophosphite, boric acid and its derivatives such as boric anhydride ($B_2O_3$). A catalyst capable of chemically absorbing water, such as phosphoric anhydride ($P_2O_5$) or pyrophosphoric acid ($H_4P_2O_7$), may advantageously be used. In this case, its effect is dual, it allows absorption of a portion of the water formed during the reaction or present in the monomer(s) used and catalysis of the reaction. Mixtures of catalysts may also be used.

Preferably, phosphoric anhydride as a catalyst will be used, introduced into the extruder, in an amount corresponding to a relative percentage of the total mass of monomers expressed in <<pcr>> units, preferably comprised between 0.01 pcr and 1 pcr. Such a catalyst may be used alone, or as an addition to another catalyst. Phosphoric anhydride may also be dissolved in dimethylsulfoxide (DMSO) before being solubilized in one of the molten monomers.

When it is impossible to introduce into the extruder phosphoric anhydride satisfactorily and when DMSO cannot be used, it is recommended to substitute it with phosphoric acid. The introduced amounts expressed in <<pcr>> units are then comprised between 0.01 pcr and 0.1 pcr, preferably between 0.04 pcr and 0.07 pcr.

It is also possible to introduce into the extruder, separately or as a mixture with a monomer, any customary additive used in the preparation of polyamides, such as anti-oxidants, UV stabilizers, nucleating agents, or further pigments. Also, it is possible to introduce into the extruder any compound which may be conventionally grafted on a polyamide chain, by this, is meant a substitution of the hydrogen bound to the nitrogen of the amide bond or a reaction with the amine and acid functions. An incorporation method will be selected in order to avoid reactions of the compounds to be grafted with the amine and acid functions of the monomers, for example by injection at an area of the extrusion line where the yield of the reaction is sufficiently high.

Introducing one or several monomers including more than two acid or amine functions may also be contemplated in order to obtain branched structures.

Introducing one or several chain extenders may further be contemplated, in order to accelerate the increase in the molar masses and/or obtain polyamides of higher molar mass.

The object of the invention is also extruders adapted for applying a method according to the invention. The invention therefore relates to the extruders which have either one of the characteristics described earlier, alone or combined, or even all the characteristics described earlier which are notably:

- the extruder includes several areas in succession in the direction for conveying the material, in order to produce according to a continuous method, the desired polyamide: an area ($Z_0$) for introducing the monomer(s), followed by a mixing area ($Z_1$), followed by an isolation area ($Z_2$) allowing the formation of a continuously renewed material plug by conveyance of the material, followed by a polycondensation area ($Z_3$). The polycondensation area ($Z_3$) may be followed by a transport and cooling area ($Z_4$);
- the extruder includes on each conveying screw which makes it up, several, preferably at least four, shearing segments each linking at least two shearing elements and a retention element; such shearing areas are preferably present, both in the mixing area and in the polycondensation area;
- the extruder includes on each conveying screw which makes it up, at the mixing area, several, preferably at least three or four, transport elements, advantageously followed by at least one, and notably one or two, shearing segments linking at least one, preferably at least two, or even three shearing elements. The shearing elements preferably will have fins shifted by an angle which increases according to the direction opposite to the direction of rotation of the conveying screws, in the conveying direction of the material;
- the mixing area may include a degassing device;
- the isolation area may be formed by one or several elements ensuring shrinkage of the passage for the material or by a succession of at least one, preferably at least two retention elements;
- the extruder used includes, in the polycondensation area, on each conveying screw which makes it up, at least one, and notably two, three or four shearing segments linking at least two shearing elements and one retention element;
- the extruder used includes, in its polycondensation area, on each conveying screw which makes it up, at least one, and notably one or two shearing segments linking at least three shearing elements and one retention element;
- the extruder used includes, in its polycondensation area, on each conveying screw which makes it up, at least one shearing segment linking a shearing element including 4 fins shifted by an angle of 30° according to the direction opposite to the direction of rotation of the conveying screws, a shearing element including 4 fins shifted by an angle of 60° according to the direction opposite to the direction of rotation of the conveying screws, a shearing element including 4 fins shifted by an angle of 90° according to the direction opposite to the direction of rotation of the conveying screws, so as to convey the material in the conveying direction, and a retention element which may notably be a reverse transport element or a shearing element including 4 fins shifted by an angle of 60° according to the direction of rotation of the conveying screws, so as to retain the material,
- the extruder is connected to at least two devices for discharging the water formed by the polycondensation reaction (or more generally the reaction by-product(s) generated by the polycondensation reaction), equipped with a system allowing re-injection into the extruder of the monomer(s) carried away with the condensation by-product(s) formed. Preferably, such devices give the possibility of generating negative pressure areas within the extruder. Such devices are advantageously located in the polycondensation area. They are preferably preceded by an inert gas inlet and may also be preceded, and optionally succeeded by an element for shrinking the passage for the material;

the extruder includes a sequence of elements allowing the polycondensation reaction to be conducted for a sufficient time in order to attain the desired degree of polymerization at the extruder outlet; the dwelling time of the material in the extruder is preferably greater than or equal to 3 or 4 minutes, and notably from 3 to 30 minutes and typically from 6 to 20 minutes, the extruder is selected from:
  twin-screw extruders having a working length of at least 50 D, typically greater than or equal to 70 D, advantageously greater than or equal to 90 D, and very advantageously greater than or equal to 120 D,
  planar 3-screw extruders having a working length of at least 33 D, typically greater than or equal to 40 D, advantageously greater than or equal to 50 D, and very advantageously greater than or equal to 80 D,
  planar 4-screw extruders having a working length of at least 24 D, typically greater than or equal to 30 D, advantageously greater than or equal to 40 D, and very advantageously greater than or equal to 60 D,
  planar 6-screw extruders having a working length of at least 16 D, typically greater than or equal to 20 D, advantageously greater than or equal to 25 D, and very advantageously greater than or equal to 40 D,
  planar 8-screw extruders having a working length of at least 12 D, typically greater than or equal to 15 D, advantageously greater than or equal to 20 D, and very advantageously greater than or equal to 30 D,
  annular 4-screw extruders having a working length of at least 36 D, typically greater than or equal to 44 D, advantageously greater than or equal to 56 D, and very advantageously greater than or equal to 88 D,
  annular 6-screw extruders having a working length of at least 29 D, typically greater than or equal to 364 D, advantageously greater than or equal to 46 D, and very advantageously greater than or equal to 72 D,
  annular 8-screw extruders having a working length of at least 24 D, typically greater than or equal to 28 D, advantageously greater than or equal to 36 D, and very advantageously greater than or equal to 56 D,
  annular 10-screw extruders having a working length of at least 19 D, typically greater than or equal to 24 D, advantageously greater than or equal to 31 D, and very advantageously greater than or equal to 48 D, and
  annular 12-screw extruders having a working length of at least 14 D, typically greater than or equal to 16 D, advantageously greater than or equal to 32 D, and very advantageously greater than or equal to 40 D;
the extruder is an extruder including more than two conveying screws.

Such an extruder will be connected to a control unit notably giving the possibility of controlling the monomer supply flow rates and the speed of rotation of the conveying screws. Further, the extruder will be equipped with devices for heating and regulating the temperature, giving the possibility of maintaining the desired temperature, corresponding to the temperatures mentioned earlier, in each of the relevant areas.

The examples which follow allow illustration of the invention.

EXAMPLES 1 TO 6

Figure 8:
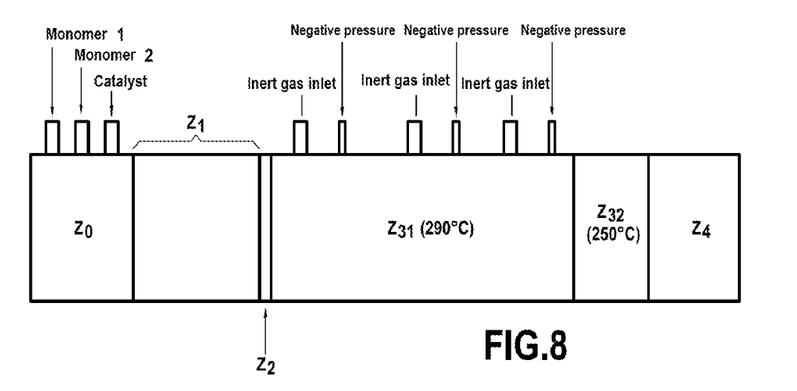
FIG. 8 is a schematic illustration of the various areas of one of the extruders used in the examples.

One of the extruders used in the tests 2 and 5 is schematically shown in FIG. 8. The screws of the extruder rotate co-rotatively in the anticlockwise direction.

For the whole of the tests, a discharge pump, a so-called <<melt-pump>> (Model EX22, Eprotech) is positioned after the area $Z_4$.

A polyamide 6-10 is polycondensed as follows from hexamethylenediamine and sebacic acid on a co-rotating twin-screw extruder of the TSA brand with a diameter (D) of 26 mm and with a length/diameter ratio (L/D) of 80 (Tests 1 and 3) or 110 (Tests 2 and 4).

For tests 1, 2, 3, 5 and 6, the amine heated to 70° C. and the acid to 150° C. are separately introduced in liquid form into the extruder with an excess of amine, the amine/acid molar ratio is 1.046. The total flow rate is 6 kg/h.

For test 4, the amine heated to 70° C. in liquid form and the acid kept in a solid form at room temperature are separately introduced into the extruder with an excess of amine, the amine/acid molar ratio is 1.046. The total flow rate is 6 kg/h.

For tests 3, 4 and 6, the catalyst used is $P_2O_5$. For tests 3 and 6, it is dissolved beforehand in dimethylsulfoxide (DMSO) and it is then mixed with sebacic acid in a 0.1/99.9 mass ratio in order to have a final content of 0.06 pcr.

For test 4, the $P_2O_5$, is directly mixed with the solid acid in a 0.1/99.9 mass ratio in order to have a final content of 0.06 pcr.

For test 5, the catalyst used is $H_3PO_4$. It is mixed with molten sebacic acid in a 0.1/99.9 mass ratio in order to have a final content of 0.06 pcr.

In the introduction area $Z_0$ and in the mixing area $Z_1$ for the monomers and in the area $Z_2$ for forming the material plug, the temperature is of 140-200° C. For the tests 1, 2, 3, 5 and 6, the area for mixing the monomers and the area for forming the material plug consists of a sequence [S26/R/26]-[KB30/4/R/26]-[KB90/4/R/26]-[S26/R/26].

For test 4, the mixing area for the monomers and the area for forming the material plug ends with a sequence [S26/R/26]-[KB30/4/R/26]-[KB60/4/R/26]-[KB90/4/R/26], terminated by a shrinkage element (plug). The temperature is 200° C. at the plug.

Next, in the polycondensation area, sequencing shearing segments and at least one negative pressure area at 100 mbars forming an area $Z_{31}$, the temperature is 290° C. This polycondensation area includes different sequences [KB60/4/R/26]-[KB90/4/R/26]-[KB60/4/L/26] or [S26/L/26], and at least one sequence [KB30/4/R/26]-[KB60/4/R/26]-[KB90/4/R/26]-[KB60/4/L/26] or [S26/L/26] which, for some of them are separated by an area for introducing nitrogen followed by a negative pressure area. Different areas for introducing nitrogen are present, first of all at the introduction of the monomers, and then before each negative pressure area along the extruder with a total flow rate of 4 L/h. In the last segment $Z_{32}$ of the polycondensation area, the temperature is reduced to 250° C. and an aperture is present for degassing the material. A transport area $Z_4$ ends the extrusion. The temperatures of the area $Z_4$ and of the discharge pump (<<melt-pump>>) are regulated to the same temperature as that of the area $Z_{32}$, i.e. 250° C.

For tests 1, 3, 4 and 5, the total length of the conveying screws is 80 D and two negative pressure areas are present which correspond to a working length of 50 D. The tests 3 and 4 use phosphorus pentoxide ($P_2O_5$) as a catalyst and test 5 uses phosphoric acid ($H_3PO_4$). Both catalysts are limited to a content of 0.06 pcr based on the total mass of the monomers.

For the tests 2 and 6, the total length of the conveying screws is 110 D and three negative pressure areas are present which correspond to a working length of 70 D. Test 6 uses a catalyst (phosphorus pentoxide) at a content of 0.06 pcr based on the total mass of the monomers.

EXAMPLE 7 TO 10

The tests 7 to 10 were conducted under conditions identical with those of test 1 (except for the differences mentioned hereafter), but they were conducted on a multi-screw extruder with 12 screws of a diameter of 18 mm with a total flow rate of 11 kg/h.

For the tests 7 and 9, two negative pressure areas are present and the extruder has a total length of 30 D which corresponds to a working width of 16 D. The test 7 uses a catalyst (phosphorus pentoxide) at a content of 0.06 pcr based on the total mass of the monomers. It was solubilized beforehand in DMSO before its addition into sebacic acid.

For the tests 8 and 10, four negative pressure areas are present and the extruder has a total length of 40 D which corresponds to a working length of 22 D. The test 10 uses a catalyst (phosphorus pentoxide) at a content of 0.06 pcr based on the total mass of the monomers. It was solubilized beforehand in DMSO before its addition into sebacic acid.

The viscosity index (<<viscosity number: VN>>) is determined according to the directives of the ISO 307:2007 standard. The solvent used for forming the polymer solutions is a mixture of phenol and of dichlorobenzene with a mass distribution of 50% each. The polyamide is dissolved at 135° C. for 45 minutes for a final concentration of 5 mg·ml. After cooling to room temperature, the flow times of the polymeric solutions and of the solvent mixture alone are measured at 25° C. in a thermostated bath by means of a viscometer of the Ubbeldohde type including a capillary with an inner diameter of 1.03 mm+/−2% (ISO3105 standard).

The molar masses of the polyamides are determined by steric exclusion chromatography by using as an elution solvent 1,1,1,3,3,3-hexafluoro-2-propanol. The polyamides are dissolved in this same solvent at a concentration of 1 mg·ml and the elution flow rate is 0.75 ml·min$^{-1}$. The polymer used for the calibration between molar masses and the elution time is typically polymethyl methacrylate.

The mechanical properties were measured after shaping by injection on H2 specimens at a tensile rate of 50 mm/min, according to the ISO 527 standard. The elongation at break percentage and the stress at the threshold were measured.

Tests with the Twin-Screw of 26 mm

| Test | 1 | 2 | 3 | 4 | 5 | 6 |
|---|---|---|---|---|---|---|
| L/D | 80 | 110 | 80 | 80 | 80 | 110 |
| Negative pressure area | 2 | 3 | 2 | 2 | 2 | 3 |
| Catalyst | | | 0.06 | 0.06 | 0.06 | 0.06 |
| Catalyst | | | P2O5 | H3PO4 | P2O5 | P2O5 |
| Temperature of area $Z_{31}$ | 290 | 290 | 290 | 290 | 290 | 290 |
| IV ml/g | 111 | 160 | 164 | 152 | 159 | 218 |
| Mn | 20.5 | 31.2 | 31.4 | 28.4 | 30.7 | 40.9 |
| Mw | 38.1 | 63.3 | 69.8 | 55.3 | 63.3 | 86.1 |
| PI | 1.86 | 1.98 | 2.05 | 1.98 | 1.98 | 2.1 |

-continued

| Test | 1 | 2 | 3 | 4 | 5 | 6 |
|---|---|---|---|---|---|---|
| Elongation at break (%) | 25 | 83 | 93 | 89 | 91 | 103 |
| Stress at the threshold (MPa) | 57 | 58 | 59 | 54 | 58 | 61 |

Tests with the Multi-Screw (12)

| Test | 7 | 8 | 9 | 10 |
|---|---|---|---|---|
| L/D | 30 | 40 | 30 | 40 |
| Vacuum area | 2 | 4 | 2 | 4 |
| Catalyst | | | 0.06 | 0.06 |
| Temperature of area $Z_{31}$ | 290 | 290 | 290 | 290 |
| IV ml/g | 113 | 162 | 152 | 219 |
| Mn | 20.5 | 31.6 | 29.3 | 44.6 |
| Mw | 38.1 | 63.5 | 58.3 | 95.4 |
| PI | 1.86 | 2.01 | 1.98 | 2.13 |
| Elongation at break (%) | 35 | 90 | 95 | 105 |
| Stress at the threshold (MPa) | 58 | 57 | 59 | 61 |

It emerges from the obtained results that:
Tests 1 and 2 show the effect of the length of the extruder on the product at the output.
The tests 3, 4 and 5 show the effect of the presence of the catalyst as compared with examples 1 and 2.
The tests 3 and 4 show the benefit of having both monomers in liquid form.
Tests 7 and 8 show the benefit of a multi-screw as compared with a twin-screw and tests 9 and 10 show the effect of the presence of the catalyst as compared with tests 7 and 8.

The invention claimed is:

1. A method for preparing a polyamide by polycondensation from one or several monomers adapted for preparing a polyamide characterized in that:
the selected monomer(s) are introduced without any preliminary reaction and without any preliminary preparation of the corresponding salt, into an extruder including at least two conveying screws rotating co-rotatively,
all the reaction and polycondensation steps, initially starting with the selected monomer(s), and giving the possibility of ending up with the desired polyamide, are conducted in a single extruder including at least two conveying screws rotating co-rotatively,
polycondensation is achieved by carrying out at least two operations for discharging the formed by-product(s) by the polycondensation reaction,
and in that it includes the following successive steps:
a step for mixing the selected monomer(s),
a polycondensation step conducted by successively carrying out shearing and depressurization operations on the material conveyed by the conveying screws,
a step for forming a plug of material continuously renewed by conveyance of the material on the conveying screws, between the mixing and polycondensation steps; said material plug consisting of the advancing material filling the whole space available for the passage of the material and forming an area which is hermetic to vapors, including monomer vapors which may be generated,
wherein the obtained polyamide has a viscosity index at least equal to 80 ml/g.

2. The method for preparing a polyamide according to claim 1, characterized in that the average degree of polymerization ($PD_n$) of the obtained polyamide is at least equal to 50.

3. The method for preparing a polyamide according to claim 1, characterized in that the obtained polyamide has a mass average molar mass (Mw) at least equal to 14,000 g/mol.

4. The method for preparing a polyamide according to claim 1, characterized in that, during the step for mixing the monomer(s), and during the step for forming the plug, the material is maintained at a temperature greater by at most 100° C. than the melting temperature of the monomer having the highest melting point, and greater by more than 5° C. than the melting temperature of the monomer having the highest melting point.

5. The method for preparing a polyamide according to claim 1, characterized in that, during the polycondensation step, the material is maintained at a temperature greater than the temperatures applied during the mixing and forming steps for the material plug, which for example belongs to the range from 150 to 350° C.

6. The method for preparing a polyamide according to claim 1, characterized in that the extruder used includes, for each conveying screw which makes it up, several, preferably at least four, shearing segments each linking at least two shearing elements and one retention element.

7. The method for preparing a polyamide according to claim 1, characterized in that the extruder used includes several areas in succession in the direction of conveyance of the material, in order to produce according to a continuous method, the desired polyamide: an area ($Z_0$) for introducing the monomer(s), followed by an area for mixing the monomer(s) ($Z_1$), followed by a polycondensation area ($Z_3$).

8. The method for preparing a polyamide according to claim 1, characterized in that mixing area ($Z_1$) and the polycondensation area ($Z_3$) are separated by an isolation area ($Z_2$), in order to avoid the passage of vapors of monomers.

9. The method for preparing a polyamide according to claim 1, characterized in that the isolation area ($Z_2$) on each conveying screw consists of at least one element for shrinking the passage for the material and of at least two retention elements.

10. The method for preparing a polyamide according to claim 1, characterized in that the extruder used includes, in the mixing area ($Z_1$), on each conveying screw which makes it up, several transport elements, followed by at least one shearing segment linking at least one shearing elements and one retention element.

11. The method for preparing a polyamide according to claim 1, characterized in that the extruder used includes, in the polycondensation area ($Z_3$), on each conveying screw which makes it up, at least three shearing segments linking at least two shearing elements and one retention element.

12. The method for preparing a polyamide according to claim 1, characterized in that the extruder used includes, also in its polycondensation area ($Z_3$), on each conveying screw which makes it up, at least one shearing segment linking at least three shearing elements and one retention element.

13. The method for preparing a polyamide according to claim 1, characterized in that in the shearing segment(s), the shearing elements include fins shifted by an increasing angle along the direction opposite to the direction of rotation of the conveying screws, in the conveying direction of the material.

14. The method for preparing a polyamide according to claim 1, characterized in that the operations for discharging the formed by-product(s) by the polycondensation reaction are accompanied by re-injection into the extruder of the monomer(s) carried away with the formed by-product(s).

15. The method for preparing a polyamide according to claim 1, characterized in that the operations for discharging the formed by-product(s) are accompanied by the generation of a negative pressure area within the extruder.

16. The method for preparing a polyamide according to claim 1, characterized in that the operations for discharging the formed by-product(s) are preceded with an injection of inert gas into the extruder.

17. The method for preparing a polyamide according to claim 1, characterized in that the extruder includes a sequence of elements giving the possibility of conducting the polycondensation reaction for sufficient time in order to attain the desired conversion rate at the output of the extruder.

18. The method for preparing a polyamide according to claim 1, characterized in that the extruder is selected from:
twin-screw extruders having a working length of at least 50 D,
planar 3-screw extruders having a working length of at least 33 D,
planar 4-screw extruders having a working length of at least 24 D,
planar 6-screw extruders having a working length of at least 16 D,
planar 8-screw extruders having a working length of at least 12 D,
annular 4-screw extruders having a working length of at least 36 D,
annular 6-screw extruders having a working length of at least 29 D,
annular 8-screw extruders having a working length of at least 24D,
annular 10-screw extruders having a working length of at least 19 D, and
annular 12-screw extruders having a working length of at least 14 D.

19. The method for preparing a polyamide according to claim 1, characterized in that the extruder is an extruder including more than two conveying screws.

20. The method for preparing a polyamide according to claim 1, characterized in that the extruder includes, on each conveying screw which makes it up, at least 14 transport elements, at least 18 shearing elements, and at least 6 retention elements.

21. The method for preparing a polyamide according to claim 1, characterized in that the dwelling time of the material in the extruder is greater than or equal to 3 or 4 minutes.

22. The method for preparing a polyamide according to claim 1, characterized in that the monomer(s) introduced into the extruder preferably contain a water content of less than 5% by mass.

23. The method for preparing a polyamide according to claim 1, characterized in that a pair of monomers consisting of a diamine and of a diacid is introduced into the extruder and at least two operations for discharging the water formed by the polycondensation reaction are carried out.

24. The preparation method according to claim 1, characterized in that it uses a stoichiometric excess of the most volatile monomer corresponding to a stoichiometric ratio which range up to 1.2.

25. The method for preparing a polyamide according to claim 1, characterized in that the monomer(s) is(are) introduced into the extruder in a liquid molten form.

26. The method for preparing a polyamide according to claim 1, characterized in that it uses a catalyst selected from the following:
a pentavalent phosphorus, a phosphorus ester, and boric acid and its derivatives.

27. An extruder adapted for applying a method according to claim 1.

28. A method for preparing a polyamide by polycondensation from one or several monomers adapted for preparing a polyamide characterized in that:
the selected monomer(s) are introduced without any preliminary reaction and without any preliminary preparation of the corresponding salt, into an extruder including at least two conveying screws rotating co-rotatively,
all the reaction and polycondensation steps, initially starting with the selected monomer(s), and giving the possibility of ending up with the desired polyamide, are conducted in a single extruder including at least two conveying screws rotating co-rotatively,
polycondensation is achieved by carrying out at least two operations for discharging the formed by-product(s) by the polycondensation reaction,
and in that it includes the following successive steps:
a step for mixing the selected monomer(s),
a polycondensation step conducted by successively carrying out shearing and depressurization operations on the material conveyed by the conveying screws,
a step for forming a plug of material continuously renewed by conveyance of the material on the conveying screws, between the mixing and polycondensation steps; said material plug consisting of the advancing material filling the whole space available for the passage of the material and forming an area which is hermetic to vapors, including monomer vapors which may be generated,
and in that the average degree of polymerization ($PD_n$) of the obtained polyamide is at least equal to 50.

29. A method for preparing a polyamide by polycondensation from one or several monomers adapted for preparing a polyamide characterized in that:
the selected monomer(s) are introduced without any preliminary reaction and without any preliminary preparation of the corresponding salt, into an extruder including at least two conveying screws rotating co-rotatively,
all the reaction and polycondensation steps, initially starting with the selected monomer(s), and giving the possibility of ending up with the desired polyamide, are conducted in a single extruder including at least two conveying screws rotating co-rotatively,
polycondensation is achieved by carrying out at least two operations for discharging the formed by-product(s) by the polycondensation reaction,
and in that it includes the following successive steps:
a step for mixing the selected monomer(s),
a polycondensation step conducted by successively carrying out shearing and depressurization operations on the material conveyed by the conveying screws,
a step for forming a plug of material continuously renewed by conveyance of the material on the conveying screws, between the mixing and polycondensation steps; said material plug consisting of the advancing material filling the whole space available for the passage of the material and forming an area which is hermetic to vapors, including monomer vapors which may be generated,
and in that the obtained polyamide has a mass average molar mass (Mw) at least equal to 14,000 g/mol.

30. The method for preparing a polyamide according to claim 1, characterized in that the obtained polyamide has a viscosity index in a range of from 120 to 250 ml/g.

31. The method for preparing a polyamide according to claim 1, characterized in that the dwelling time of the material in the extruder is from 4 to 30 minutes.

32. The method for preparing a polyamide according to claim 1, characterized in that the extruder is selected from:
twin-screw extruders having a working length greater than or equal to 70 D, and
annular 12-screw extruders having a working length greater than or equal to 32 D.

33. The method for preparing a polyamide according to claim 1, characterized in that the extruder is selected from:
twin-screw extruders having a working length greater than or equal to 90 D, and
annular 12-screw extruders having a working length greater than or equal to 40 D.

* * * * *